United States Patent [19]

Pleasance

[11] 3,751,607

[45] Aug. 7, 1973

[54] METHOD OF CONTROL OF LINE CIRCUIT CUTOFF RELAY

[75] Inventor: Charles A. Pleasance, Palatine, Ill.

[73] Assignee: GTE Automatic Electric Laboratories Incorporated, Northlake, Ill.

[22] Filed: June 5, 1972

[21] Appl. No.: 259,641

[52] U.S. Cl. .......... 179/175.2 R

[51] Int. Cl. .......... H04m 3/22

[58] Field of Search .......... 179/175.2 R, 18 F, 179/175.3

[56] References Cited

UNITED STATES PATENTS 2,959,642 11/1960 Dubuar .......... 179/18 F

*Primary Examiner*—Kathleen H. Claffy
*Assistant Examiner*—Douglas W. Olms
*Attorney*—K. Mullerheim B. E. Franz et al.

[57] ABSTRACT

An arrangement for remotely controlling a line circuit cutoff relay including diodes through which the "C" lead of each line circuit is connected to a common wire attached to an isolated battery or power supply, with the latter further being connected to each test board or wire-chief test trunk and each terminating junctor. Each terminating junctor also is provided with a relay (KO) which responds to a + potential from the isolated battery. As soon as the KO relay operates, it connects the incoming "EC" lead to the outgoing "C" lead. The incoming remote test circuit, that is, the wire chief junctor, is arranged to connect + potential from the isolated battery to the "EC" lead to the group selector matrix.

5 Claims, 5 Drawing Figures

METHOD OF CONTROL OF LINE CIRCUIT CUTOFF RELAY

Figure 1:
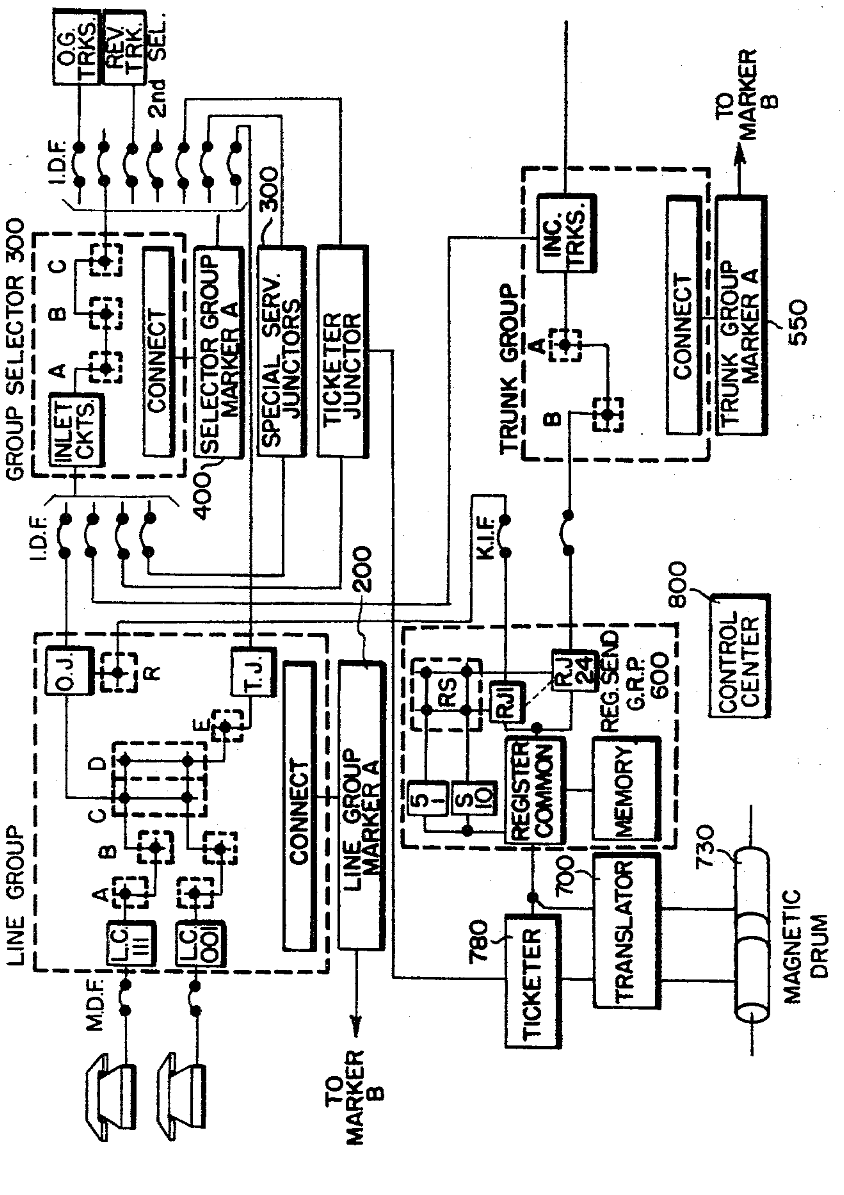

This invention relates to a central-office equipment testing arrangement, and more particularly, to an arrangement for controlling the line circuit cutoff relay in order to free a line of attachments so that the line can be tested.

In the course of making line tests, it is necessary that the cutoff relay be controlled from the test board or wire-chief test desk in order to free the line of attachments. If a line is permanent, it is usually holding a trunk or junctor that feeds battery and ground to the line, making test impossible. If the cutoff relay can be released, the connection from the line to the trunk being held or junctor can be broken. When the cutoff relay is re-operated, the line can be made free for application of a meter and test potentials at the test board or wire-chief test desk.

Control of the line cutoff relays in an electronic crosspoint system is complicated by the fact that a direct connection to the sleeve or "C" lead at the line equipment cannot be achieved, because hold relays of the line group correed arrays are in series on this lead. Thus, the present method for controlling cutoff relays makes use of the marker and system processor, an extremely cumbersome arrangement which is also rather expensive. Such a method is generally disclosed in U.S. Pat. No. 3,376,398, to John R. Vande Wege, wherein a relay circuit is provided to connect a shunt circuit across the cutoff relay of the line circuit associated with the line in question in response to a ground signal from a wire-chief test desk via a wire-chief junctor circuit. The shunt circuit is a low-impedance relay connected in parallel with the cutoff relay by means of a relay tree which selects the particular line circuit of the line group. This relay then causes the cutoff relay to restore, thereby connecting the line relay to the switching stages in order to initiate a call, while maintaining the original connection from the wire-chief test desk to the line in question.

According to the present invention, a battery that is isolated from ground is used for holding the terminating line group matrix while permitting the cutoff relay to restore. Without ground, the cutoff relay must restore, although remaining correeds in the switched path will stay operated. This method of controlling the cutoff relay is implemented by providing diodes through which the "C" lead of each line circuit is connected to a common wire attached to the isolated battery or power supply, with the latter further being connected to each test board or wire-chief test trunk and each terminating junctor. Each terminating junctor also is provided with a relay (KO) which responds to a + potential from the isolated battery. As soon as the KO relay operates, it connects the incoming "EC" lead to the outgoing "C" lead. The incoming remote test circuit, that is, the wire chief junctor, is arranged to connect + potential from the isolated battery to the "EC" lead to the group selector matrix, when the BCO key is operated at the test board or wire-chief test desk.

Accordingly, the principal object of this invention is to provide an improved arrangement or method for controlling the line circuit cutoff relays in order to free a line of attachments so that the line can be tested.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1–5 wherein:

FIG. 1 is a block diagram of a telephone switching system; and

Figure 2:
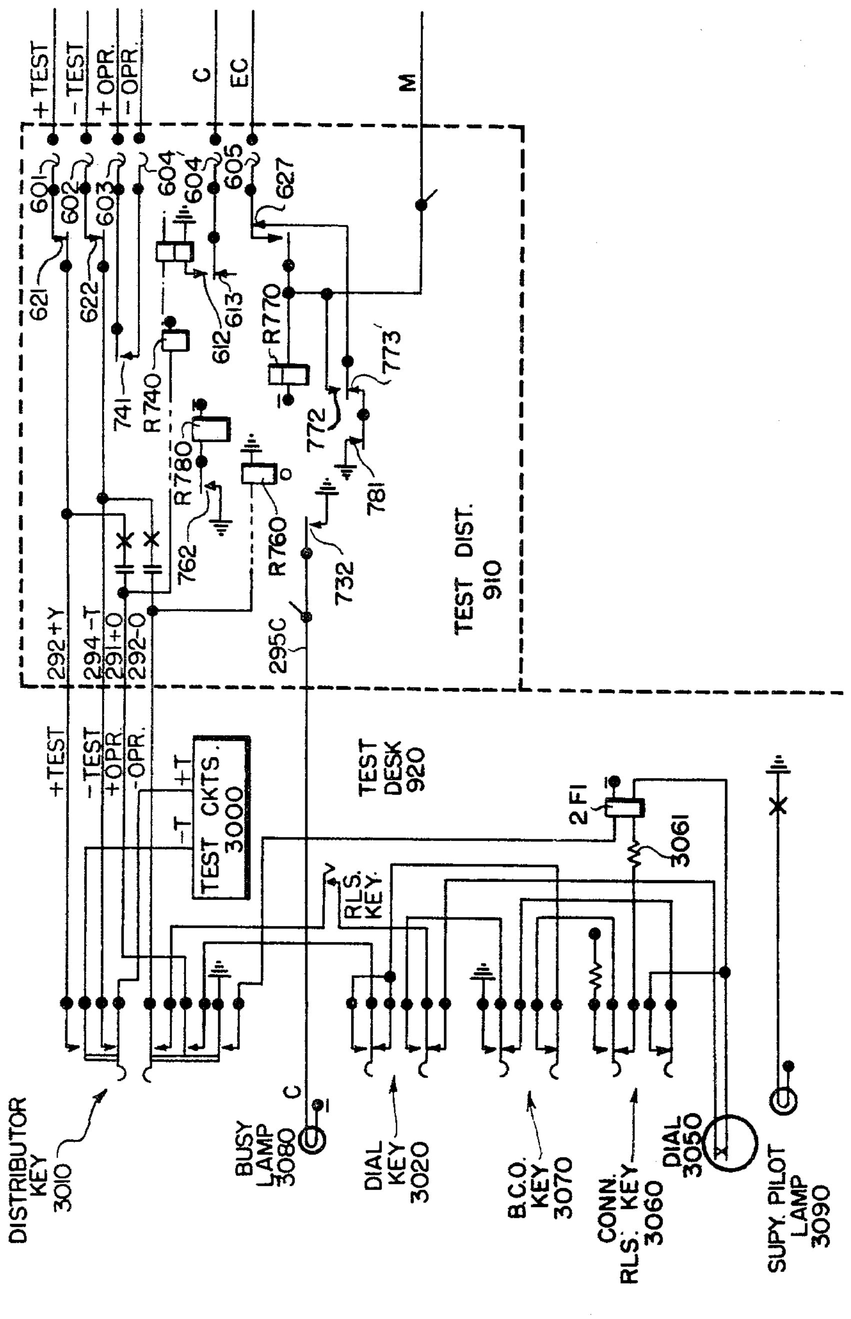
Figure 3:
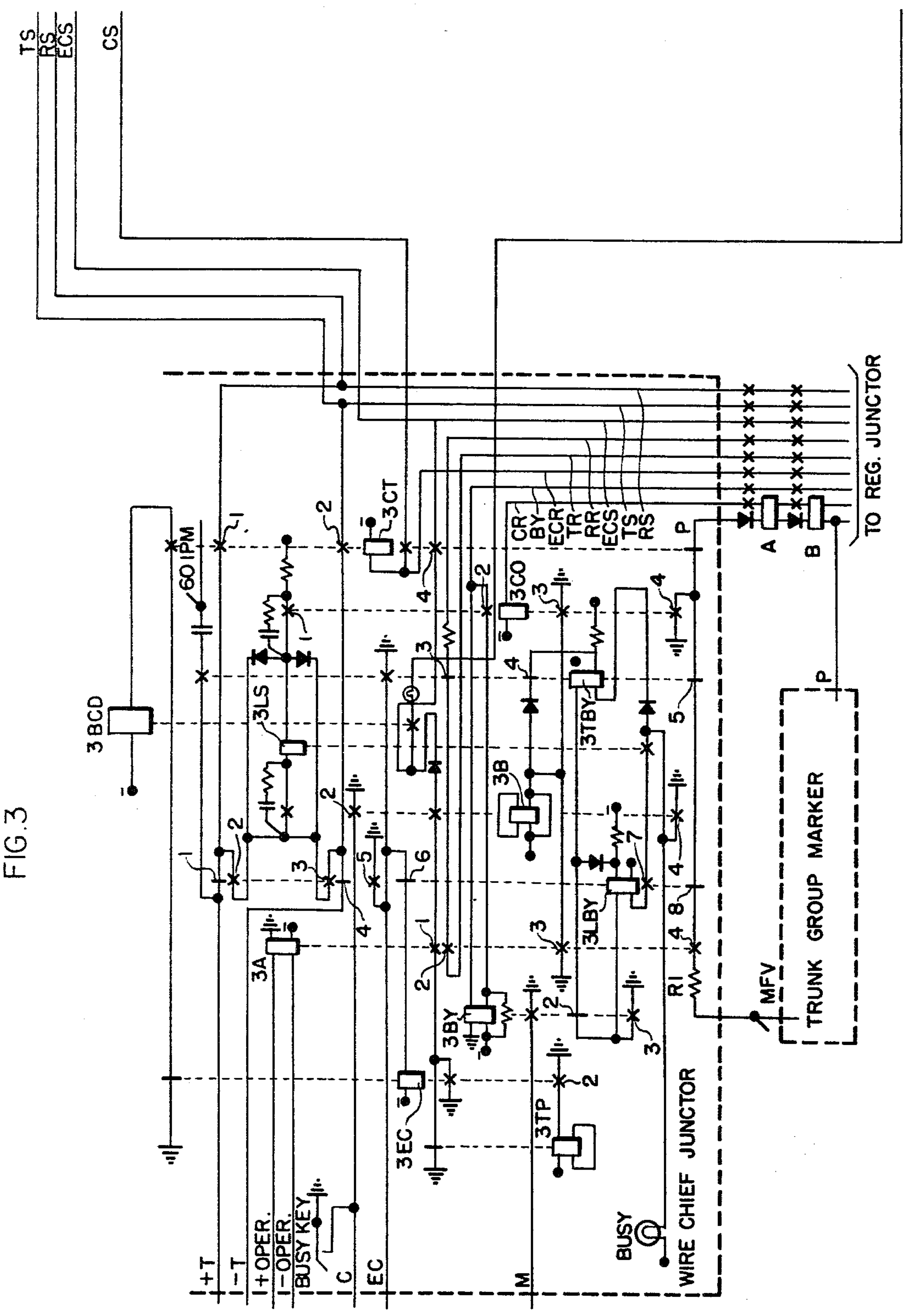
Figures 4, 5:
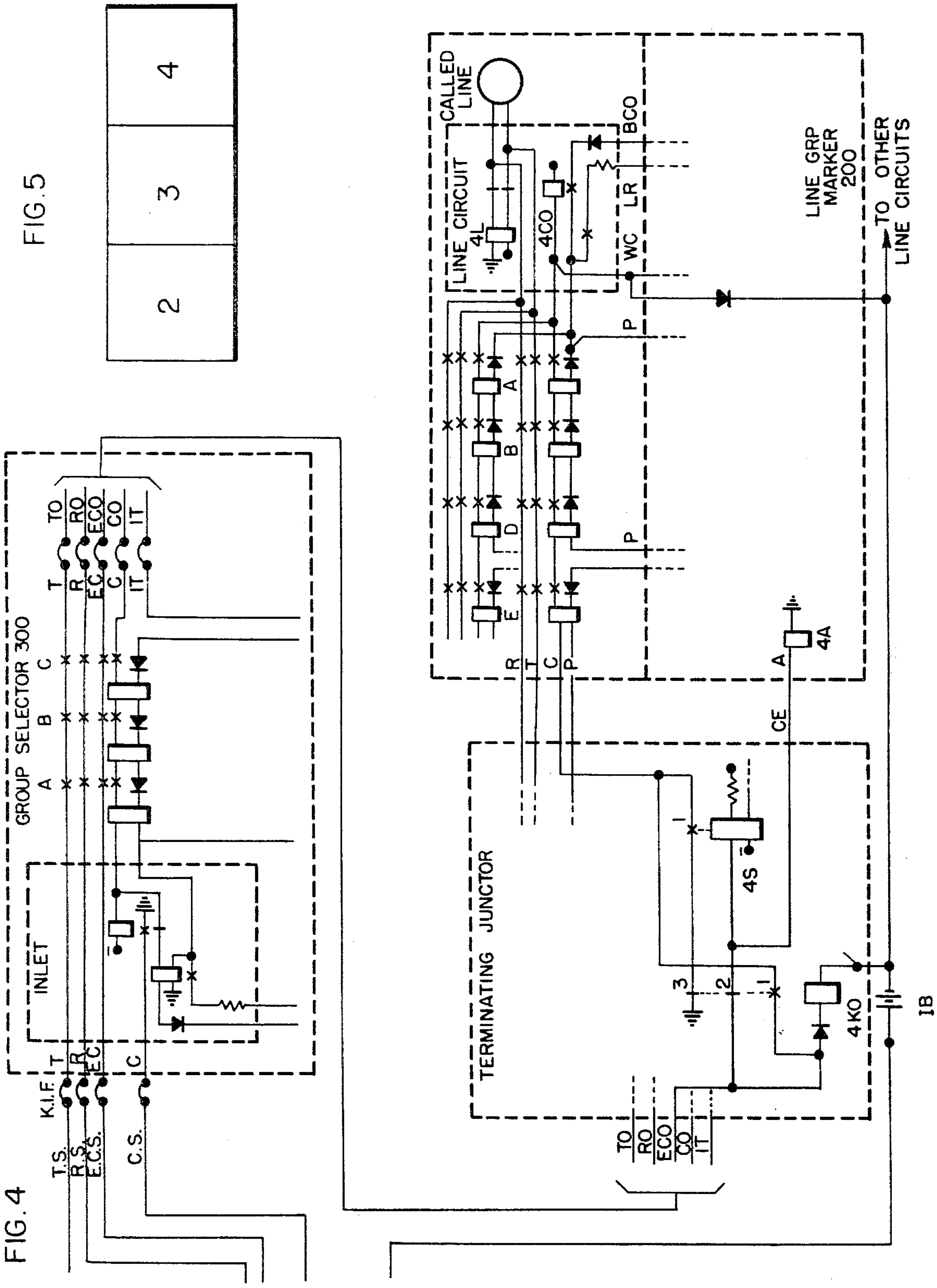

FIGS. 2–4 when arranged as shown in FIG. 5 comprise a schematic and functional block diagram of a wire chief test-call arrangement.

The invention is explained according to the following outline:

Part 1 — System organization
Part 2 — Typical call
Part 3 — Wire chief test calls
Part 4 — Test desk and test distributor
Part 5 — Wire chief junctor
Part 6 — Terminating junctor
Part 7 — Test call operation

PART 1 – SYSTEM ORGANIZATION

Referring now to FIG. 1, the system consists of the line group 100, group selector 300, register-sender group 600 and the translator 700. There is also a trunk group 500 which provides access from incoming trunks to the registers, and a control center 800 which contains a special computer for operation analysis and recording, and program upgrading equipment. For further description of the system in general and the line group 100 the following patents may be referred to:

U.S. Pat. No. 3,170,041 issued Feb. 16, 1965 to K.K. Spellnes;

U.S. Pat. No. 3,275,752 issued Sept. 27, 1966 to M.H. Esperseth, K.K. Spellnes, W.R. Wedmore and F.B. Sikorski; and U.S. Pat. No. 3,293,368 issued Dec. 20, 1966 to W.R. Wedmore.

All of the electronic equipment is furnished in duplicate, for instance, two line group markers 200 may serve up to 10 line groups and two group selector markers 400 may serve up to 10 group selectors. A minimum of two register-sender groups 600 will be equipped per office and the translator 700, including the magnetic drum 730 and logic circuitry, will always be furnished in pairs per 10,000 directory numbers.

Time division techniques are used in the register-sender group 600 and in the translator 700. For further description of the register-sender group the following patents may be referred to:

U.S. Pat. No. 3,278,691 issued Oct. 11, 1966 to B. Sherstiuk;

U.S. Pat. No. 3,278,693 issued Oct. 11, 1966 to B. Sherstiuk; and

U.S. Pat. No. 3,301,963 issued Jan. 31, 1967 to D. Lee and H. Wirsing.

The markers are designed on an electronic basis and semiconductor circuitry is employed throughout the system. A ferrite core memory is used for temporary storage whereas the magnetic drum 730 is used for semi-permanent storage.

The space division switching elements of the system consists of reed relay matrix assemblies in configurations of 10 × 6, 10 × 5 and 10 × 4. The crosspoints are made up of reed capsules and having normally two windings. They are mounted on a two layer printed card and the entire assembly constitutes a switching matrix. In some cases the cards are wired together to form a single larger matrix. The system contains no conventional telephone relays, but, similar functions are performed by reed relays. A reed relay assembly is essentially a cluster of magnetic reed elements controlled by coil windings and with or without a permanent magnet. For further description of the reed relay assemblies and crosspoint matrix assemblies the following patents may be referred to:

U.S. Pat. No. 3,188,423, Crosspoint Switching Arrays, issued June 8, 1965 to E. J. Glenner and K.K. Spellnes;

U.S. Pat. No. 3,128,356, Dry Reed Relays, issued Apr. 7, 1964 to G.S. Lychyk and A. Taliste; and U.S. Pat. No. 3,193,731, Printed Matrix Board Assembly, issued July 6, 1965 to P.K. Gerlach, G.J. David and R.O. Stoehr.

The electronic logic circuitry employs eight standard circuits as building blocks. These standard circuits include NOR gates, inverters, flip-flops, clocks, gated pulse amplifiers, parallel test circuit, parity circuit, and reed relay driver. All of these circuits are implemented on double or single-sided printed cards, 6 inches by 5½ inches.

The two switching stages, the line group and group selector may not necessarily be installed in the same building. The line group may be remotely located and will then operate as a satellite office. No register-senders will be needed in the satellite, but a transceiver will provide for sending and receiving of switching information between the markers of the satellite and the register-senders in the main office.

The method of signaling between the system group is accomplished by a technique called di-phase. This method employs a phase shift technique for serial sending and receiving of pulses.

The group selector may, in connection with the register-sender group and the translator, operate as a trunk tandem office and for this purpose the line group is not necessary. By using matrices with six reed capsules per crosspoint, this group selector marker may accommodate four-wire switching.

The reason for this flexible operation of the system lies in the fact that the register-sender group, in connection with the storage in the translator, has sufficiently built-in features for the above described operation.

PART 2 — TYPICAL CALL

As an introduction to the system operation, a brief description of a typical local call as processed through the system is now presented. The block diagram in FIG. 1 may be followed for tracing the call.

When a subscriber lifts the handset, the line group marker 200 goes into action by detecting the originating call mark, identifying the calling line, and selecting an idle register junctor within the register-sender. A path is then temporarily established from the calling telephone to the register junctor via the A, B, C, and R matrices, and the subscriber receives dial tone. The dialed digits are stored temporarily, coded, and processing is continued as these digits are passed to the translator 700, analyzed for type of incoming call, and instructions are selected from the drum memory 730 and returned to the register-sender 600 to guide further handling of the call. Upon receipt of the remaining digits, the translator 700 returns switching instructions corresponding to the called number as stored in the drum memory 730. The instructions are transmitted from the register-sender 600 via one of the senders and the originating junctor of the originating line group to the group selector 300. In the group selector 300, the instructions are analyzed by the marker 400, an idle terminating junctor in the terminating line group is located, and a path established to that line group via the A, B, and C matrices of the group selector. The remaining instructions are followed by the line group marker to locate the called line terminals, select and seize a path from the terminating junctor through the E, D, B and A matrices to the called line. The terminating junctor establishes ringing, answer supervision, and talking battery for both parties when the call is answered.

Since the system is a common control operation, the markers of the line group and group selector function only to serve the assigned portion of the call processing then release to serve other calls. The register-sender 600 and the translator 700 are functioning on a time division basis and therefore are processing several calls simultaneously. The temporary signaling and control talking paths are held through the switching matrices and junctors.

PART 3 — WIRE CHIEF TEST CALLS

Referring now to FIGS. 2–4, the system is provided with facilities for testing the outside cable plant, subscribers' equipment, and central office equipment. A certain amount of this testing can be done from test desk 920 located in the central office. In a single office exchange and in some of the multi-office exchanges, the test desk is connected to the system via test distributor 910 and the wire-chief junctor 510, which is connected to the banks of the test distributor 910 in the same office. A step-by-step test connector can also be connected to the bank contacts of test distributor 910 so that step-by-step equipment can also be accessed by test desk 920. The purpose of the wire-chief junctor, or the test connector, is to select the line to be tested in a particular 100-line group. The wire-chief test man dials a first digit to step the test distributor 910 vertically and then a second digit to rotate the distributor to the proper position for access to a given wire-chief junctor or test connector. Thereupon, three additional digits are dialed to access a given line for testing purposes.

The wire-chief junctor 510 is one of the incoming trunks of the trunk group 500, which is connected via the A and B matrices to the register-sender group 600 under the control of the trunk group marker 550. The wire-chief junctor 510 is connected via the KIF distributing frame to inlet circuit 310 of the group selector 300, and then to the IDF distributing frame via the A, B, and C matrices of the group selector under the control of the group selector marker 400. A connection is thereby established to a terminating junctor, which then establishes the terminating connection via the E, D, B and A switching stages, under the control of the line group marker 200, and thence to the particular line circuit of the line to be tested, Test desk 920 can thereby establish a direct, metallic connection to a given subscriber's line for testing purposes.

PART 4 — TEST DESK AND TEST DISTRIBUTOR

Referring now to FIG. 2, test desk 920 is a conventional wire-chief test desk consisting of test circuits 3000, dial 3050, relay 2F1, and various keys and lamps.

Test distributor 910 is a conventional test distributor circuit as disclosed in U.S. Pat. No. 2,866,008. See test distributor 910 shown in FIGS. 6 and 7. Test distributor 910 can be used in this system substantially as shown with one minor modification. Lead M has been added from relay R770 to each wire-chief junctor connected to test distributor 910 without being connected via the bank contacts. This added connection is necessary to enable the test distributor to work with both a step-by-step test connector and a wire chief junctor due to an incompatibility in the two types of systems. In a step-by-step system, the EC lead is connected directly from the test distributor to the called line and therefore ground is returned almost immediately to the test distributor to operate relay R770 in the event that the called line is busy. However, in a system that does not switch an EC lead all the way from a calling line to a called line, relay R770 restores (after a slow-to-release interval) before the markers determine that the called line is busy. Relay R770 must be operated when ground is returned via lead EC to lock relay R770 indicating a busy condition, because lead EC is coupled to relay R770 via its own contacts 772'. Ground via lead M, therefore, causes relay R770 to operate so that ground via lead EC can cause relay R770 to lock, thereby indicating a busy condition.

PART 5 — WIRE CHIEF JUNCTOR

Referring now to FIG. 3, the wire-chief junctor circuit 510, which is one of the incoming junctors of the trunk group 500, provides access to the system from the wire-chief test desk 920 via test distributor 910. The wire chief can access the system in order to test a line; and furthermore the wire-chief junctor circuit includes relay 3LS to camp-on a busy line and to automatically cut through when the line becomes idle. It can be noted that this relay 3LS can also be used in other types of junctor circuits to camp-on a busy line to automatically cut through when the line becomes idle, establishing a new connection from another calling line to the line in question.

The wire-chief junctor circuit 510 also seizes the trunk group marker 550 upon seizure of the wire-chief junctor to establish a connection to an idle register junctor. Thereupone, dial pulses are detected and then repeated to the register junctor to establish a connection to the called line via the group selector 300, terminating junctor, and thence to the line group. The wire-chief junctor also holds the terminating junctor and, therefore, the group selector matrix via the ECS lead.

Relay 3A is operated in response to the receipt of dial pulses which then repeats the dial pulses via lead TR and RR to the incoming register junctor 624. Relay 3CO is the control relay which operates when a connection is established to an idle register junctor. Relay 3BY is a differentially wound reed relay which operates in response to either a ground signal or a negative battery potential via lead BY from the register junctor, thereby designating either a trunk busy condition or alternatively a line busy condition respectively. The break contacts are held normally closed by permanent magnet which in relay 3BY is opposed by the upper winding and aided by the lower winding; therefore ground on lead BY shunting the upper winding causes the make contacts to operate to the closed condition and the break contacts to remain closed, so that contacts 2 and 3 provide an operate path for relay 3TBY when a trunk busy condition is signaled. Relay 3LBY operates and locks in response to relay 3BY during a line busy condition to connect relay 3LS across leads TS and RS. Therefore, relay 3LS remains connected across leads TS and RS even after the register junctor has released which causes relay 3BY to restore. Relay 3LS is the loop sensing relay which operates in series with the battery-feed relay for the busy line which is to be tested. This relay has a diode bridge associated with it so that the relay operates even with different battery polarities present on leads T and R, that is, ringing, etc. This relay remains operated as long as the line to be tested remains busy. Once the busy line becomes idle, relay 3LS restores and thereby causes relay 3LBY to restore. The restoration of relay 3LBY causes relay 3EC to operate and transmit a signal to the wire-chief test desk 920 via test distributor 910 indicating that the line to be tested has become idle. Relay 3TBY is the trunk busy relay which designates that a trunk busy condition has occurred. Relay 3B operates in response to the operation of relay 3A upon seizure by the wire chief and remains operated so long as the wire chief junctor is seized. Relay 3CT is the cut-through relay which is operated when a connection is established to a register junctor and also when a connection is established to the line that is to be tested by means of the terminating junctor.

Relay 3TP is a timing relay that provides a time-delayed ground pulse on lead ECS designating the performance of the inward equipment test. When the wire chief operates B.C.O. key 3070, relay 3EC restores, thereby removing ground from lead ECS and opening the circuit to relay 3TP. Since relay 3TP is slow to release, ground is re-connected to lead ECS within 50 milliseconds (the slow-to-release interval of relay 3TP), thereby designating the performance of the inward test. This timed ground pulse is detected in the line group marker and distinguished from a release signal, which would be complete removal of ground from lead ECS. Note that the timed-ground pulse is generated for 50 milliseconds ragardless of when B.C.O. key 3070 is released so that the wire chief test man can perform the inward equipment test in exactly the same manner for a step-by-step system as for the system described herein.

PART 6 — TERMINATING JUNCTOR

The terminating junctor is shown in FIG. 4. It provides access from a group selector outlet, via the IDF through the junctor and thence through matrices E, D, B and A to a called line. Battery feed is provided by the terminating junctor both to the calling line and to the called party. In addition, the terminating junctor provides a path from the TO and RO conductors to conductors TC and RC, which completes a path from the sender over the transmission path to the send-receive circuit in the marker.

The junctor is seized by ground forwarded via lead ECO to operate relay 4S. This relay through its contacts completes paths to ground to hold both the preceding switch train and the succeeding switch train.

In response to answer supervision, the called party is connected to the voice transmission path. Ground also is extended to lead ECO to repeat answer supervision to the preceding switch train. Opening lead ECO releases the succeeding switch train but holds the terminating junctor seized. The terminating junctor is released when negative battery potential is applied to lead ECO.

Release of the preceding switch train is delayed approximately 135 milliseconds after the calling part releases to protect against unintentional interruption of the calling loop.

Timed disconnect of the preceding switch train and the terminating junctor 30 seconds after the called party disconnected is provided.

An arrangement is provided to permit the called party to hold the succeeding switch train and the terminating junctor.

PART 7 — TEST CALL OPERATION

Referring now to FIGS. 2–arranged as shown in FIG. 5, a wire-chief test call can be initiated from test desk 920 via test distributor 910 to the wire-chief junctor 510 for access to a given called line. The wire-chief test call is initiated manually via test desk 920 for a given line.

WIRE CHIEF CALL

Wire chief test desk 920 seizes a given line by operating distributor key 3010, thereby causing relays R760 and R740 in the test distributor 910 to operate in series. Thereupon, two digits are dialed from dial 3050 which causes the test distributor switch to advance one step vertically and one step rotationally, thereby connecting the test distributor 920 to the wire chief junctor 510 via the bank contacts of test distributor 910. As mentioned previously, lead M is directly connected from the test distributor 910 to the wire chief junctor 510 without passing through the bank contacts. Thereafter, three additional digits are dialed from dial 3050 which are repeated via test distributor 910 to leads +OPR and −OPR to the wire chief junctor 510. Relay 3A operates, via contact 3 causing relay 3B to operate at contacts 4 to seize the trunk group marker 550. The trunk group marker 550 pulls the crosspoints for the A and B matrices by closing a circuit through the crosspoints via contacts of relays 3TBY, 3LBY, 3CT and 3A in series with resistor R1 to lead MFV of the trunk group marker 550.

After the crosspoints have been operated a connection is established from the wire-chief junctor 510 to the incoming register junctor of the register-sender group. This idle register junctor will then cause relay 3CT and 3CO to operate, once the connection has been established. Thereupon, the relay 3CO at contacts 4 provides a ground on lead MVF to indicate to the trunk group marker that the connection has been established.

Thereafter, the wire-chief test desk 920 dials the three digits necessary to reach a given called line. Relay 3A at contact 2 repeats these dial pulses via leads TR and RR to the register junctor. The dial pulses are stored in the register-sender group and then translated. The switching digits are then sent via leads TS and RS to the KIF distributing frame and thence to the group selector. The connection is established through the group selector via crosspoints A, B, and C to the terminating junctor. The first three digits from the sender to the send-receiver circuit 1000 of the line group marker 200 select the line terminal and the fourth digit is used for ringing control. The connection is further established to the line group switching stages via the E, D, B, and A crosspoints to the line circuit for the called line.

After these connections have been established, the marker returns an indication to the register-sender group. As a result, relay 3CT is operated from the register junctor and is locked via lead CS. Thereafter, the register-sender group and the register junctor are disconnected which thereby causes relay 3CO to restore.

The test desk 920 then has a direct metallic path from the test circuit 3000 via leads +T and −T to the called line, and therefore the outside line can be tested.

As indicated above, it is necessary that the cutoff relay 4CO be controlled from the wire-chief test desk 920 in order to free the line of attachments. If a line is permanent, it is usually holding a trunk or junctor that feeds battery and ground to the line, making test impossible. In accordance with the present invention, control of the cutoff relays are accomplished by connecting the lead C of each line circuit through a diode DS to a common wire CC which is attached to a separate power supply or isolated battery IB. The latter is then connected to each wire-chief test trunk and each terminating junctor. The terminating junctors are each provided with a relay 4KO which responds to a + potential from the isolated battery IB, to connect the incoming lead ECO to the outgoing lead C. In addition, the incoming remote test circuit is provided with a relay 3BCO which is operated when the BCO key is operated at the test desk, to connect + potential from the isolated battery to the lead EC to the group selector matrix and thence to the lead C. Without ground, the cutoff relays must release, but the terminating line group matrix will be held. When the cutoff relays release, the connection from the line to the trunk being held or junctor is broken.

More specifically, to release the cutoff relay 4CO, the BCO key 3070 at the test desk 920 is operated and its operation causes relays R740 and R70 of the test distributor 910 to restore. The restoration of relay 760, and therefore relay R780, causes ground from contacts 781 to be removed from lead EC, thereby causing relay 3EC of the wire-chief junctor 510 to restore. As a result, ground at contacts 1 is removed from lead ECS and at contacts 2 the winding of relay 3TP is open circulated. However, relay 3TP does not restore since it has a slow-to-release characteristic. Meanwhile, the ground being removed from lead ECS causes relay 4A of the line group marker 200 to operate in series with relay 4S of the terminating junctor and lead CE. The terminating junctor remains seized by keeping relay 4S operated, which cause ground to be maintained to lead CO and to lead C so that both the originating connection from the wire chief junctor to the terminating junctor and the terminating connection from the terminating junctor to the called line remain locked by means of the ground connected to the holding windings of the crosspoint for the group selector switching matrices and the line group switching matrices.

Now relay 3TP of the wire-chief junctor 510 restores after a 50 millisecond time delay, which in general is a shorter time than the manual release time of the BCO key 3070 of the test desk. Ground is reconnected to lead ECS via the break contact of relay 3TP. Therefore, ground is connected to lead ECS and thence to lead ECO to the terminating junctor.

However, at the time relay 3EC restores, direct ground at its contact 3 causes the relay 3BCO to operate, which at its break contact 2 again removes the ground from lead ECS. Relay 3BCO at its make contact 1 which is a make-before-break contact connects +50 volts from the isolated battery IB to lead ECS. This +50 volts is extended to the group selector 300, to lead EC, through group selectors switching matrices A, B, and C, to lead ECO of the terminating junctor. The lead KO connects the +50 volts through diode 5D1 and the relay 5KO to the negative terminal of the isolated battery IB, thus causing relay 4KO to operate. As soon as relay 4KO operates, at its contact 1, it connects the incoming lead ECO to the outgoing lead C and, at its contact 3, removes ground on the outgoing lead C. At its contact 2, the +50 volts is disconnected from the relay 4S, and the latter remains operated via the ground on lead CE. Without ground on lead C, the cutoff relay 4CO is released, and the connection from the line to the trunk being held or junctor is released. When the cutoff relay 4CO is released, the line relay 4L is connected. After the trunk or junctor is released and the cutoff relay 4CO is re-operated, the line can be made free for application of a meter and test potentials at the test board or wire-chief test desk.

It will thus be seen that the objects set forth above, among those made apparent from the preceding description are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a communication switching system having a plurality of two-conductor subscriber lines, a marker-controlled switching network having a selector section and a line section for interconnecting any two of said lines, a plurality of terminating junctors one of which is included between the selector section and the line section in each connection to a called subscriber line, a plurality of line circuits individual to the subscriber lines each having a line relay and a cutoff relay with the line relay connected to the two conductors of the subscriber line via normally closed contacts of the cutoff relay, the line section of the switching network being arranged to switch two transmission conductors to connect them respectively to the two subscriber line conductors and a hold conductor connected to hold the network switches and the cutoff relay operated in a completed connection, the selector section of the network being arranged to switch two transmission conductors, a hold conductor and an extra control conductor; a wire-chief junctor connected to the input side of the selector section for use in test connections through the selector section to a terminating junctor and thence through a line section to a called subscriber line circuit; the improvement comprising an arrangement for controlling the cutoff relays in said line circuits including a separate power supply which is isolated from ground; means connecting the hold conductor of a line circuit to the negative output terminal of said separate power supply; the positive output terminal of said separate power supply being connected to said terminating junctor and to said wire-chief junctor; said wire chief junctor including means responsive to a given signal condition applied from a test board to connect a + potential from said separate power supply to said extra control conductor; and said terminating junctor including means responsive to a + potential from said separate power supply to connect said incoming extra control conductor to an outgoing hold conductor to release said cutoff relay in said called line circuit, to thereby release the connection from said called line circuit to a trunk or junctor being held.

2. In a communication switching system, the combination of claim 1, wherein the hold conductor of each of said line circuits is connected to a conductor connected in multiple to said line circuits and to the negative output terminal of said separate power supply; the positive output terminal of said separate power supply being connected in multiple to each of said terminating junctors and to said wire-chief junctor.

3. In a communication switching system, the combination of claim 1, wherein said terminating junctor includes means responsive to the + potential connected from said separate power supply to said extra control conductor to connect said incoming extra control conductor to said outgoing hold conductor.

4. In a communication switching system, the combination of claim 2, wherein said terminating junctor includes means responsive to the + potential connected from said separate power supply to said extra control conductor to connect said incoming extra control conductor to said outgoing hold conductor.

5. In a communication switching system, the combination of claim 2, wherein said wire chief junctor includes a special relay (3BCO) which is operated on connections from the wire chief junctor in response to a given signal condition applied to the wire chief junctor from a test board to close a contact (3) to connect a +potential from said separate power supply to said extra control conductor (ECS), said terminating junctor including a special relay (4KO) which is connected to said extra control conductor and to said separate power supply and thus operated when said + potential from said separate power supply is connected to said extra control conductor, said special relay (4KO) including a contact (1) for connecting said extra control conductor to said hold conductor (C) and a contact (2) for removing ground from said hold conductor normally holding said cutoff relay operated, to thereby cause said cutoff relay to release.

* * * * *